(No Model.)

N. H. EDGERTON.
SECONDARY BATTERY.

No. 491,878. Patented Feb. 14, 1893.

Witnesses:
A. J. Jolley.
K. Grady.

Inventor:
Nathan H. Edgerton
By John Jolley Jr.
his atty.

UNITED STATES PATENT OFFICE.

NATHAN H. EDGERTON, OF PHILADELPHIA, PENNSYLVANIA.

SECONDARY BATTERY.

SPECIFICATION forming part of Letters Patent No. 491,878, dated February 14, 1893.

Application filed July 11, 1892. Serial No. 439,710. (No model.)

*To all whom it may concern:*

Be it known that I, NATHAN H. EDGERTON, of the city and county of Philadelphia, in the State of Pennsylvania, have invented certain new and useful Improvements in Secondary Batteries, of which the following is a specification, due reference being had to the accompanying drawings, which illustrate my invention.

My invention relates to electric accumulators, commonly known as "secondary" or "storage batteries" the object sought to be attained being a cheap, simple and compact construction of battery, and at the same time to develop an increased voltage or tension of electrical energy, and to the end sought consists in a construction and use of a battery hereinafter particularly explained which shall possess advantages in the points of simplicity of construction and efficiency in operation.

Figure 1:
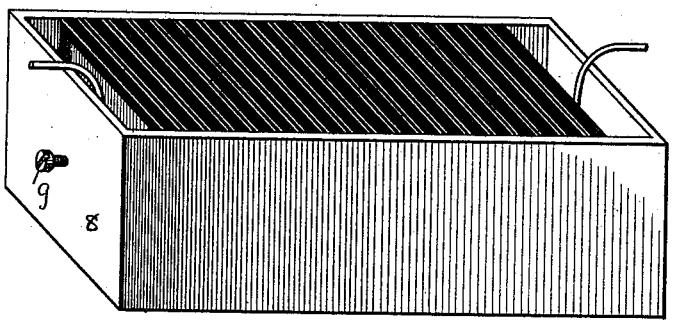
Figure 2:
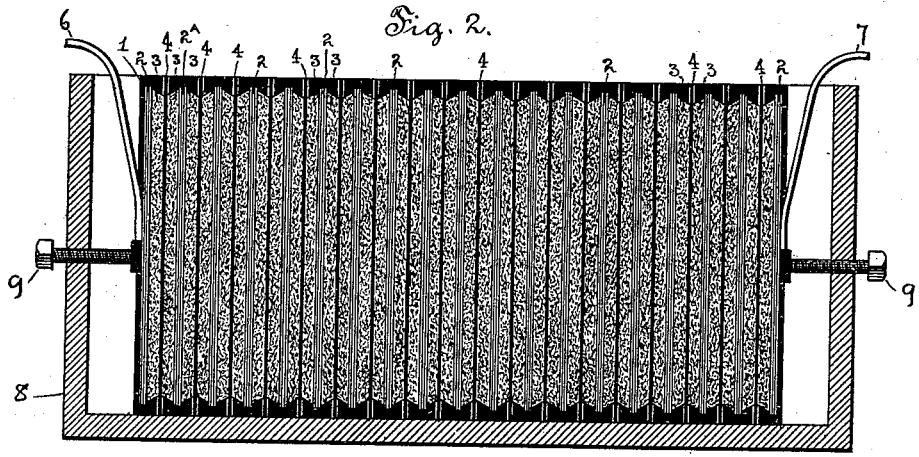
Figure 3:
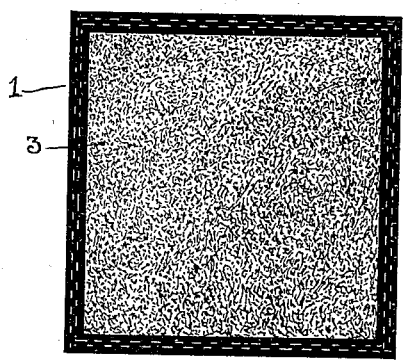
Figure 4:
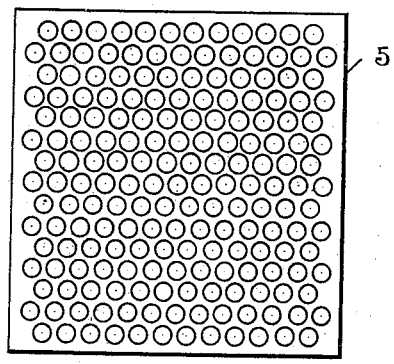

In the drawings Figure 1, is a perspective view of a battery constructed in accordance with my invention. Fig. 2, a longitudinal vertical section of the same. Fig. 3, a side view of one of the series of frames, showing a layer of active material within the same, and Fig. 4, a view of the perforated plate employed in conjunction with the frame in the preliminary preparation of the battery.

Referring to the drawings in which the several parts are indicated by numerals similar numerals denoting like parts in the several views—1, is a frame preferably rectangular in outline and of hard-rubber or other suitable non-conducting material—centrally or midway placed within this frame is a metal plate 2. In practice a series of such frames and plates is employed and to both sides of said respective plates is applied a layer of active material 3. In order to make each of said plates both a positive and negative plate— that is to say, one side or surface of the plate of positive polarity and the opposite side or surface of the same plate of negative polarity, each plate is provided as to one side with a layer of red-lead, and as to its other side with a layer of litharge, or their equivalent active material, and arranged in a manner presently made clear. The active material is baked onto said metal plate and this is conveniently accomplished in the following manner:—The metal plate and active material being in place within the frame 1, a perforated plate 5 is removably secured to each side of the frame in a suitable manner next the active material, and intermediate each perforated plate 5 and active material 3 is placed a sheet of asbestus paper 4 or suitable equivalent moisture absorbing material, which has been previously soaked with an electrolytic liquid.

The frames constituting the respective ends of the battery as a whole, differ in their make up from the other frames in the series only, in that, in each of said frames the metal plate is left free as to one side; and in one instance is provided with a layer of active material such as "red lead," and in the other instance with a layer of active material such as litharge. To the free sides of said plates preferably at or near the center thereof, are connected or attached the positive and negative wires respectively, and the current sent through the whole in a manner presently explained.

The perforated plates 5 admit the liquid electrolyte to the active mass, while the layers of asbestus paper 4 or the like serve the double purpose of absorbing and holding liquid electrolyte to keep the active mass moist and to prevent the escape of the active mass through the perforated plates. The series of frames constituting the battery are set up in such manner that the red-lead active material of one frame faces the litharge active material of the next frame and the sheet of asbestus paper between the same, and so on throughout the series.

After the active mass has been sufficiently baked, the perforated plates 5 are removed— the series of frames and their contents are then clamped together or held in close contact in a suitable manner; in the drawings I have shown for this purpose an elongated box or trough 8 and provided at each end with a tightening screw 9—and the battery is ready for use and may be charged or discharged free of being contained in a bath of electrolytic liquid, sufficient moisture may be imparted to the battery as desired through the asbestus paper or other moisture holding or absorbing medium employed intermediate adjacent or facing layers of active material, by pouring the electrolytic liquid over the battery or by seating the battery for a short time in a shallow vessel containing such liquid.

In the construction of battery described, as stated, the connecting positive and negative wires of the battery are attached to the free sides of the metal plates at the respective ends of the battery proper, and the current caused to pass centrally, so to speak, through the battery as a whole, that is to say, the current comes to the positive pole as at 6, and leaves by the negative pole, as at 7, in its passage first reaching the metal plate 2 which has positive polarity, passing through the moistening medium and the layer of active material (litharge) of the next frame to the near side of the metal plate 2ª in that frame which has negative polarity, delivered from thence to the opposite side or surface of said plate 2ª and adjacent layer of active material (red lead) which has positive polarity, and so on from plate to plate in each frame in like order to the delivery wire 7.

It will at once be obvious to those skilled in the art to which my invention appertains that such a construction of battery overcomes the difficulties heretofore existing in construction and adaptability of storage batteries, in that all intermediate couplings or connections between the metal plates are unnecessary, the ever present electrolytic bath with its accompanying pungent odor, and swashing or overflow when mounted on a moving support avoided, thus providing a superior battery for use in street-car locomotion, further, greater compactness for use, cheapness in construction, and there being but little internal resistance greater efficiency in operation.

I claim:—

1. A secondary or storage battery constructed, arranged and adapted to operate free of any characteristic surrounding electrolytic liquid, consisting of a series of independent frames unsusceptible to the action of electricity or electrolytic liquid, each provided with a metal plate, the plate in the respective end frames of the battery provided on one side with a layer of active material, and the respective intermediate plates provided as to both sides with a layer of active material, a moisture-absorbing agent of the character described, intermediate adjacent layers of active material of neighboring frames, the end metal plates in the series adapted to become of different polarity upon the passing of the charging current, and each intermediate plate adapted to become of different polarity as to its respective sides or surfaces upon the passing of the charging current, in successive order throughout the series to preserve polarity, and electrical connections with the respective end metal plates, as and for the purposes set forth.

2. A secondary or storage battery constructed, arranged and adapted to operate free of any characteristic surrounding electrolytic liquid, consisting of a series of independent non-conducting frames, each frame provided with a metal plate, the respective plates in the end frames of the battery provided on one side with a layer of active material, and the respective intermediate plates provided as to both sides with a layer of active material, a moisture-absorbing agent of the character described, intermediate adjacent layers of active material of neighboring frames, the metal plates in the respective end frames adapted to become of different polarity upon the passing of a charging current, and each intermediate metal plate similarly adapted to become of different polarity as to its respective sides or surfaces upon the passing of a charging current, in successive order throughout the series to preserve polarity, and electrical connections with the end plates only, as described and for the purposes set forth.

3. A secondary or storage battery constructed, arranged and adapted to operate free of any characteristic surrounding electrolytic liquid, consisting of a series of independent frames unsusceptible to the action of electricity or electrolytic liquid, each frame provided with a metal plate, the plate in the respective end frames of the battery provided on one side with a layer of active material and the respective intermediate plates provided as to both sides with a layer of active material, a moisture-absorbing agent of the character described, intermediate adjacent layers of active material of neighboring frames, the end metal plates in the series adapted to become of different polarity upon the passing of the charging current, and each intermediate metal plate similarly adapted to become of different polarity as to its respective sides or surfaces upon the passing of the charging current in successive order throughout the series to preserve polarity, electrical connections with the respective end metal plates only, and means for compactly holding said series of frames, as and for the purposes set forth.

In testimony whereof I have hereunto signed my name this 3d day of May, A. D. 1892.

NATHAN H. EDGERTON.

In presence of—
JOHN JOLLEY, Jr.,
GEO. H. RAPSON.